(12) United States Patent
Werner et al.

(10) Patent No.: US 6,252,903 B1
(45) Date of Patent: Jun. 26, 2001

(54) BLIND START-UP OF A DUAL MODE CAP-QAM RECEIVER

(75) Inventors: Jean-Jacques Werner, Holmdel; Jian Yang, Marlboro, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/109,364

(22) Filed: Jul. 2, 1998

(51) Int. Cl.[7] .................................................. H04L 27/01
(52) U.S. Cl. .......................... 375/232; 375/233; 375/350; 708/323
(58) Field of Search ........................... 375/229, 232–235, 375/261, 324, 340, 350; 708/323

(56) References Cited

U.S. PATENT DOCUMENTS

| | | | |
|---|---|---|---|
| 5,673,293 | * | 9/1997 | Scarpa et al. ........................ 375/321 |
| 5,799,037 | * | 8/1998 | Strolle et al. ........................ 375/233 |
| 5,930,309 | * | 7/1999 | Knutson et al. ...................... 375/340 |

OTHER PUBLICATIONS

Yang, J. and Werner, J.J., The Multimodulus Blind Equalization Algorithms, Processings of DSP97, Santorini, Greece, 1997.

Benvenuto, N. and Goeddel, T. W. "Classification of Voiceband Data Signal Using the Constellation Magnitude", IEEE Trans. Commun., vol. 43, No. 11, pp. 2759–2770, 1995.

* cited by examiner

*Primary Examiner*—Amanda T. Le
(74) *Attorney, Agent, or Firm*—Joseph J. Opalach (57) ABSTRACT

A receiver has a dual mode of operation—a carrierless amplitude modulation/phase modulation (CAP) mode and a quadrature amplitude modulation (QAM) mode-yet only requires a single equalizer structure for both the CAP mode of operation and the QAM mode of operation during blind start-up. The receiver uses the same blind equalization updating algorithm independent of the type of received signal for converging the equalizer structure. The blind equalization updating algorithm incorporates a constant R, whose value is a function of the type of received signal, e.g., a QAM signal or a CAP signal. The type of received signal is determined as a function of the in-phase component of the mean-squared error, $E[e^2_n]$.

69 Claims, 6 Drawing Sheets

FIG. 1
(PRIOR ART)
CONVENTIONAL QAM TRANSCEIVER STRUCTURE

FIG. 2
(PRIOR ART)
CONVENTIONAL CAP TRANSCEIVER STRUCTURE

FIG. 3
(PRIOR ART)
QAM TRANSCEIVER STRUCTURE

FIG. 7
200 CAP-QAM RECEIVER (MMA)

BLIND START-UP OF A DUAL MODE CAP-QAM RECEIVER

CROSS-REFERENCE TO RELATED APPLICATIONS

Related subject matter is disclosed in the co-pending, commonly assigned, U.S. Patent application of L. M. Garth, entitled "Automatic Constellation Phase Recovery in Blind Start-Up Of A Dual Mode CAP-QAM Receiver,".

FIELD OF THE INVENTION

The present invention relates to communications equipment, and, more particularly, to the use of blind equalization in a receiver.

BACKGROUND OF THE INVENTION

Figure 1:
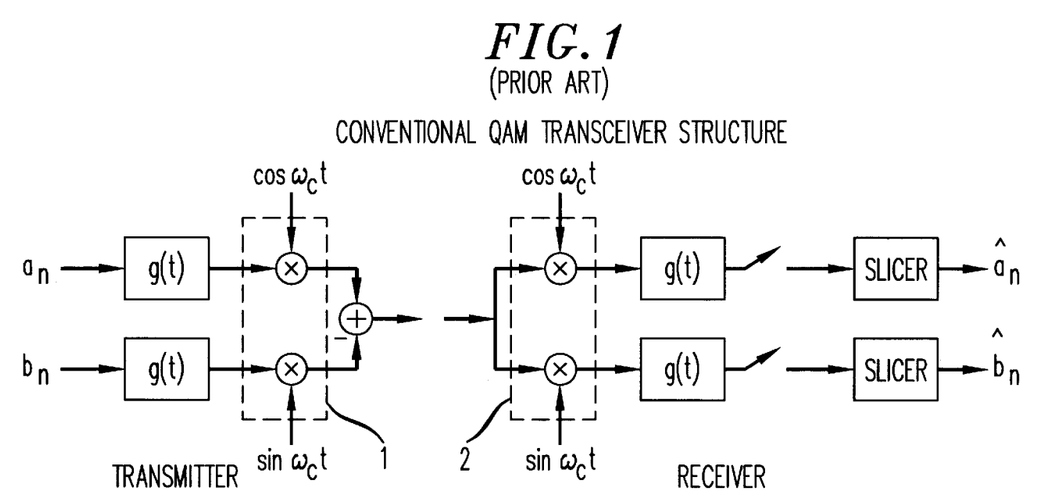
FIG. 1 is a block diagram of a prior art QAM transceiver.
Figure 2:
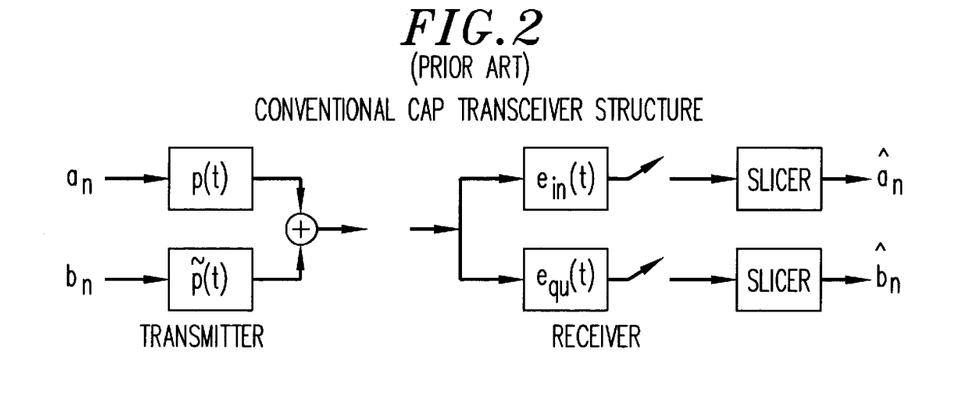
FIG. 2 is a block diagram of a prior art CAP transceiver.

Carrierless amplitude modulation/phase modulation (CAP) is a bandwidth-efficient two-dimensional passband line code. (Additional information on a CAP communications system can be found in J. J. Werner, "Tutorial on Carrierless AM/PM-Part I-Fundamentals and Digital CAP Transmitter," *Contribution to ANSI X3T9.5 TP/PMD Working Group*, Minneapolis, Jun. 23, 1992.) CAP is closely related to the more familiar quadrature amplitude modulation (QAM) transmission scheme. In voiceband modems, QAM has been used for over 25 years, while CAP has been used for over 15 years. However, CAP is simpler to implement digitally. Illustrative prior art transceiver structures for the QAM and CAP transmission schemes are shown in FIGS. 1 and 2, respectively. Both FIGS. 1 and 2 illustrate two-dimensional encoding where a complex symbol, $A_n$, is applied to the transmitter portion (where $A_n=a_n+jb_n$), and a recovered complex symbol, $\hat{A}_n$, is provided by the receiver portion, where $\hat{A}_n=\hat{a}_n+j\hat{b}_n$. With respect to other notation used in these FIGS., g(t) (e.g., see FIG. 1) is an impulse response of a baseband shaping filter, $e_{in}(t)$ and $e_{qu}(t)$ are equalizers for the in-phase and quadrature components, respectively, and p(t) and $\tilde{p}(t)$ are impulse responses of a shaping filter which form a Hilbert pair (e.g., see FIG. 2).

Figure 3:
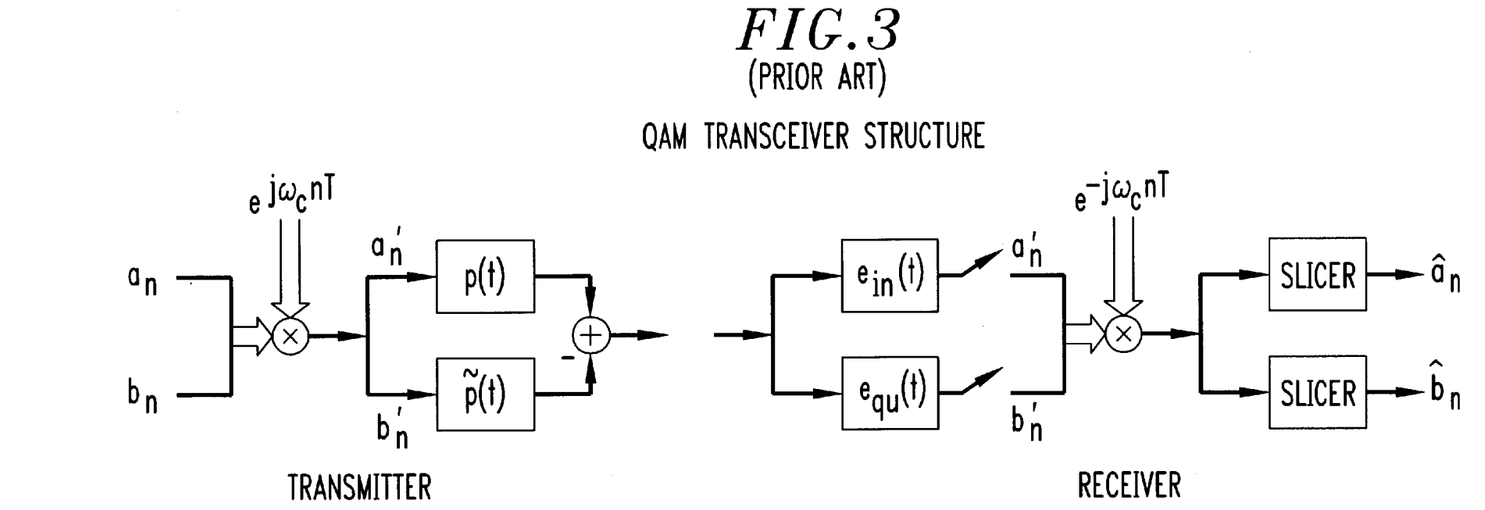
FIG. 3 is a block diagram of a prior art QAM transceiver.

As can be observed from FIG. 1, the conventional QAM transceiver structure requires a modulator 1 and a demodulator 2 at the transmitter and receiver, respectively. In contrast, the CAP transceiver of FIG. 2 does not require a modulator and a demodulator. Generally speaking, the CAP system of FIG. 2 is not compatible with the QAM system of FIG. 1, but provides the same theoretical performance as QAM and is simpler to implement digitally than QAM. Indeed, the CAP structure of FIG. 2 can be modified into a simpler QAM-only transceiver, which is shown in FIG. 3.

Currently, some broadband access applications, such as VDSL (Very high rate Digital Subscriber Line), may require either a CAP receiver or a QAM receiver. Some in the art have proposed simply putting both the CAP receiver and the QAM receiver into one receiver—in effect having a dual structure receiver with a CAP section (having its own equalizer) and a separate QAM section (with its own equalizer). To further complicate matters, this dual structure receiver may require the use of blind equalization techniques in both the QAM section and the CAP section. In this case, there is no training signal for the dual structure receiver to use to identify the type of modulation. As such, the dual structure receiver must first independently converge both the equalizer in the QAM section and the equalizer in the CAP section, and then make a decision as to the type of modulation—all of which may cause significant timing overhead.

SUMMARY OF THE INVENTION

We have developed a receiver that has a dual mode of operation—a CAP mode and a QAM mode-yet only requires a single equalizer structure for both the CAP mode of operation and the QAM mode of operation during blind start-up.

In an embodiment of the invention, a receiver comprises an adaptive filter. The same blind equalization updating algorithm is used independent of the type of received signal. The blind equalization updating algorithm incorporates a constant R, whose value is a function of the type of received signal, e.g., a QAM signal or a CAP signal. The type of received signal is determined as a function of the in-phase component of the mean-squared error, $E[e^2_n]$. As such, this receiver can be started blindly without knowing whether the received signal is a QAM signal or a CAP signal.

DETAILED DESCRIPTION

Figure 4:
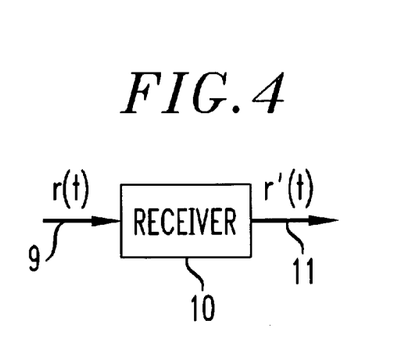
FIG. 4 is an illustrative block diagram of a portion of a communications system embodying the principles of the invention.

An illustrative high-level block diagram of a portion of a communications system embodying the principles of the invention is shown in FIG. 4. For illustrative purposes only, it is assumed that receiver 10 receives either a CAP signal or a QAM signal. It is assumed that the CAP or QAM signal has been distorted while propagating through communications channel 9 and experiences intersymbol interference (ISI). The purpose of receiver 10 is to remove the ISI and minimize the effect of any additive noise ζ(t) to provide signal r'(t). The inventive concept will illustratively be described in the context of a receiver that has a dual mode of operation—a CAP mode and a QAM mode-that utilizes only a single equalizer for both the CAP mode of operation and the QAM mode of operation.

However, before describing the inventive concept, some background information on adaptive filters is presented. Also, as used herein, an adaptive filter is, e.g., a fractionally spaced linear equalizer, which is hereafter simply referred to as an FSLE or, simply, an equalizer. Further, the term "single equalizer structure" encompasses an adaptive filter for equalizing a received signal. As known in the art, this equalizer structure, or adaptive filter, itself may comprise other filters for different components, or combinations, of the received signal. For example, a "single equalizer structure" is a cross-coupled equalizer, which comprises four filters, or a phase-splitting equalizer, which comprises two filters, etc.

Adaptive Filters, CMA and MMA

Figure 5:
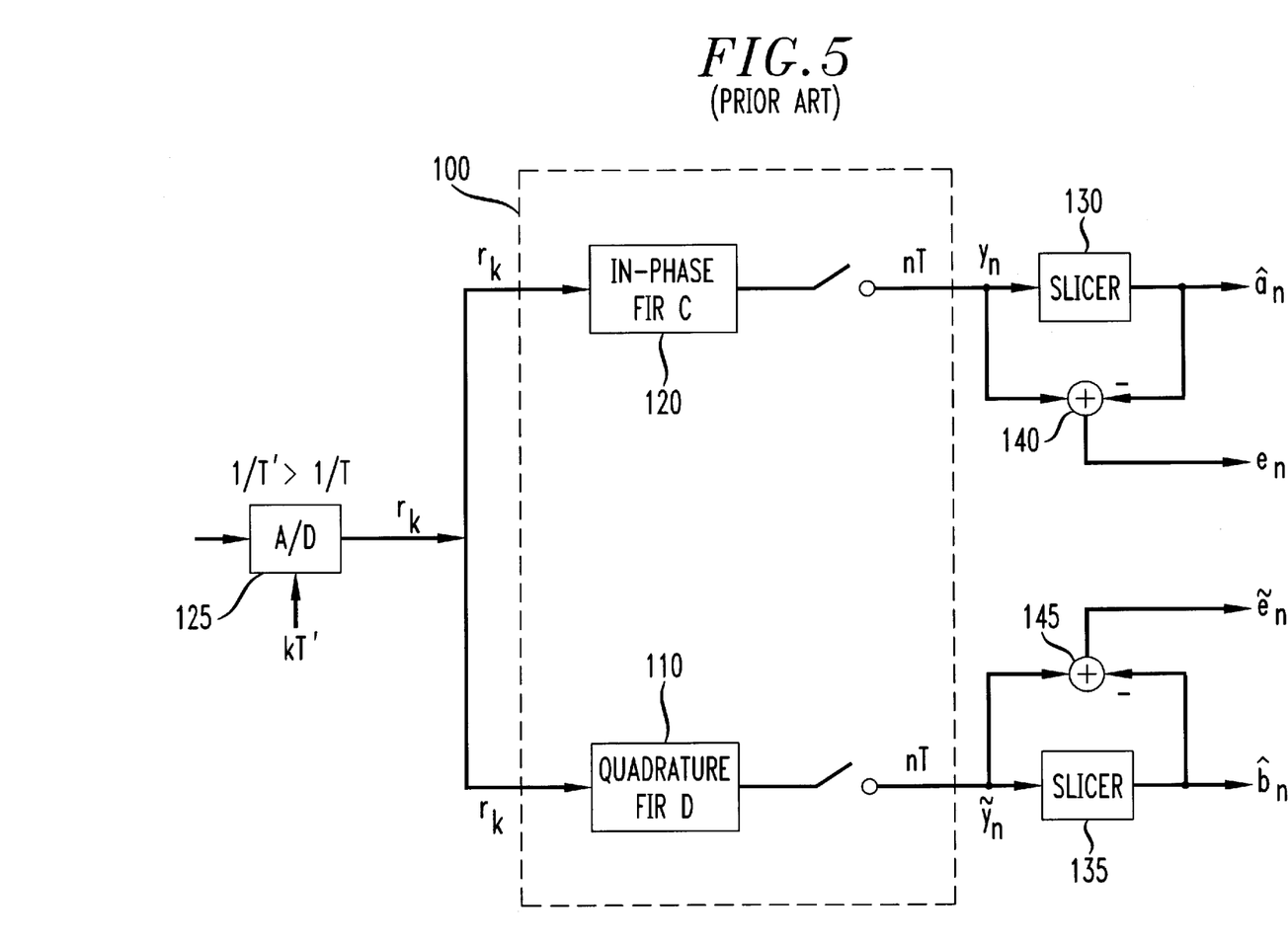
FIG. 5 is an illustrative block diagram of a phase-splitting equalizer.
Figure 6:
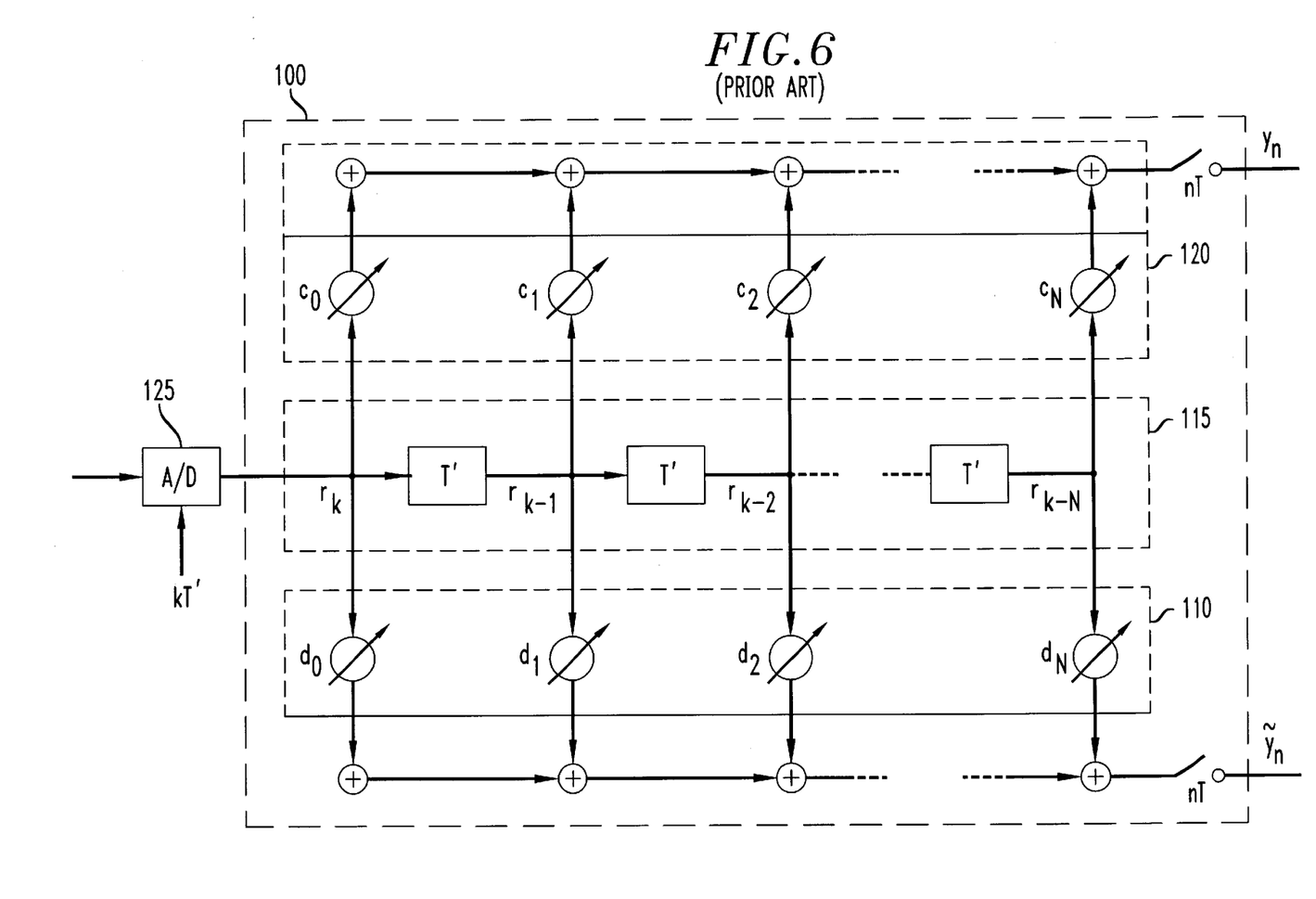
FIG. 6 is an illustrative block diagram of a portion of an adaptive filter for use in an equalizer.

An illustrative phase-splitting FSLE equalizer 100 is shown in FIG. 5. It is assumed that FSLE equalizer 100 operates on an input signal that can be characterized as having N dimensions. In this example, N=2, i.e., the input signal comprises two component dimensions: an in-phase component and a quadrature component. (It should also be noted that the term "channel" is also used herein to refer to each dimension, e.g., the in-phase dimension is also referred to as the in-phase channel.) FSLE equalizer 100 comprises two parallel digital adaptive filters implemented as finite impulse response (FIR) filters 110 and 120. Equalizer 100 is called a "phase-splitting FSLE" because the two FIR filters 110 and 120 converge to in-phase and quadrature filters. Some illustrative details of the equalizer structure are shown in FIG. 6. The two FIR filters 110 and 120 share the same tapped delay line 115, which stores sequences of successive Analog-to-Digital Converter (A/D) 125 samples $r_k$. The sampling rate $1/T'$ of A/D 125 is typically three to four times higher than the symbol rate $1/T$ and is chosen in such a way that it satisfies the sampling theorem for real signals. It is assumed that $T/T'=i$, where i is an integer.

The outputs of the two adaptive FIR filters 110 and 120 as shown in FIG. 6 are computed at the symbol rate $1/T$. The equalizer taps and input samples can be represented by a corresponding N-dimensional vector. As such, the following relationships are now defined:

$r_n^T = [r_k, r_{k-1}, \ldots, r_{k-N}]$=vector of A/D samples in delay line; (1)

$c_n^T = [c_0, c_1, c_2, \ldots, c_N]$=vector of in-phase tap coefficients; and (2)

$d_n^T = [d_0, d_1, d_2, \ldots, d_N]$=vector of quadrature phase tap coefficients; (3)

where the superscript T denotes vector transpose, the subscript n refers to the symbol period nT, and k=(i)(n).

Let $y_n$ and $\tilde{y}_n$ be the computed outputs of the in-phase and quadrature filters, respectively, and:

$y_n = c_n^T r_n$; and (4)

$\tilde{y}_n = d_n^T r_n$. (5)

An X/Y display of the outputs $y_n$ and $\tilde{y}_n$ or, equivalently, of the complex output $Y_n = y_n + j\tilde{y}_n$, is called a signal constellation. After convergence, ideally the signal constellation consists of a display of the complex symbols $A_n = a_n + jb_n$ corrupted by some small noise and ISI.

Referring back to FIG. 5, FSLE equalizer 100 can be characterized as having two modes of operation, a normal mode (steady state) and a start-up mode (non-steady state). In the normal mode of operation, the decision devices, i.e., slicers 130 and 135, compare the equalizer complex output samples, $Y_n$, (where $Y_n = y_n + j\tilde{y}_n$) with all the possible transmitted complex symbols, $A_n$ (where $A_n = a_n + jb_n$), and select the symbol $\hat{A}_n$ which is the closest to $Y_n$. The receiver then computes an error, $E_n$, where:

$E_n = e_n + j\tilde{e}_n = Y_n - \hat{A}_n$, (6)

which is used to update the tap coefficients of equalizer 100. The most common tap updating algorithm is the LMS algorithm, which is a stochastic gradient algorithm that minimizes the mean square error (MSE), which is defined as:

$MSE \triangleq E[|E_n|^2] = E[|Y_n - \hat{A}_n|^2] = E[e_n^2] + E[\tilde{e}_n^2]$. (7)

In equation (7), $E[\cdot]$ denotes expectation and $e_n$ and $\tilde{e}_n$ are the following in-phase and quadrature errors:

$e_n = y_n - \hat{a}_n$, and (8)

$\tilde{e}_n = \tilde{y}_n - \hat{b}_n$. (9)

The tap coefficients of the two adaptive filters are updated using the above-mentioned least-mean-square (LMS) algorithm, i.e., $c_{n+1} = c_n - \alpha e_n r_n$, and (10)

$d_{n+1} = d_n - \alpha \tilde{e}_n r_n$, (11)

where $\alpha$ is the step size used in the tap adjustment algorithm.

In contrast to the steady state mode of operation, the start-up mode is used to converge the tap coefficient values to an initial set of values. In some systems a training sequence is used during start-up (i.e., a predefined sequence of $A_n$ symbols), from which the receiver can compute meaningful errors $E_n$ by using the equalizer output signal $Y_n$ and the known sequence of transmitted symbols $A_n$. In this case, tap adaptation is said to be done with respect to an "ideal reference."

However, when no training sequence is available, equalizer 100 has to be converged blindly. This usually comprises two main steps. First, a blind equalization algorithm is used to open the "eye diagram." Then, once the eye is open enough, the receiver switches to, e.g., the above-described LMS tap adaptation algorithm. The philosophy of blind equalization is to use a tap adaptation algorithm that minimizes a cost function that is better suited to provide initial convergence of equalizer 100 than the MSE represented by equation (7).

As known in the art, there are three general techniques for blind equalization: one is referred to herein as the "reduced constellation algorithm" (RCA) (e.g., see Y. Sato, "A Method of Self-Recovering Equalization for Multilevel Amplitude-Modulation Systems," *IEEE Trans. Commun.,* pp. 679–682, June 1975; and U.S. Pat. No. 4,227,152, issued Oct. 7, 1980 to Godard); another technique is the so-called "constant modulus algorithm" (CMA) (e.g., see D. N. Godard, "Self-Recovering Equalization and Carrier Tracking in Two-Dimensional Data Communications Systems," *IEEE Trans. Commun.,* vol. 28, no. 11, pp. 1867–1875, Nov. 1980; and N. K. Jablon, "Joint Blind Equalization, Carrier Recovery, and Timing Recovery for High-Order QAM Signal Constellations", *IEEE Trans. Signal Processing,* vol. 40, no. 6, pp. 1383–1398, 1992); and the final technique is referred to as the "multimodulus algorithm" (MMA) (e.g., see Yang, J. and Werner, J. J., *The Multimodulus Blind Equalization Algorithms,* Proceedings of DSP97, Santorini, Greece, 1997).

Dual Mode CAP-QAM Receiver

We have developed a receiver that has a dual mode of operation—a CAP mode and a QAM mode-yet only requires a single equalizer structure for both the CAP mode of operation and the QAM mode of operation during blind start-up.

Figure 7:
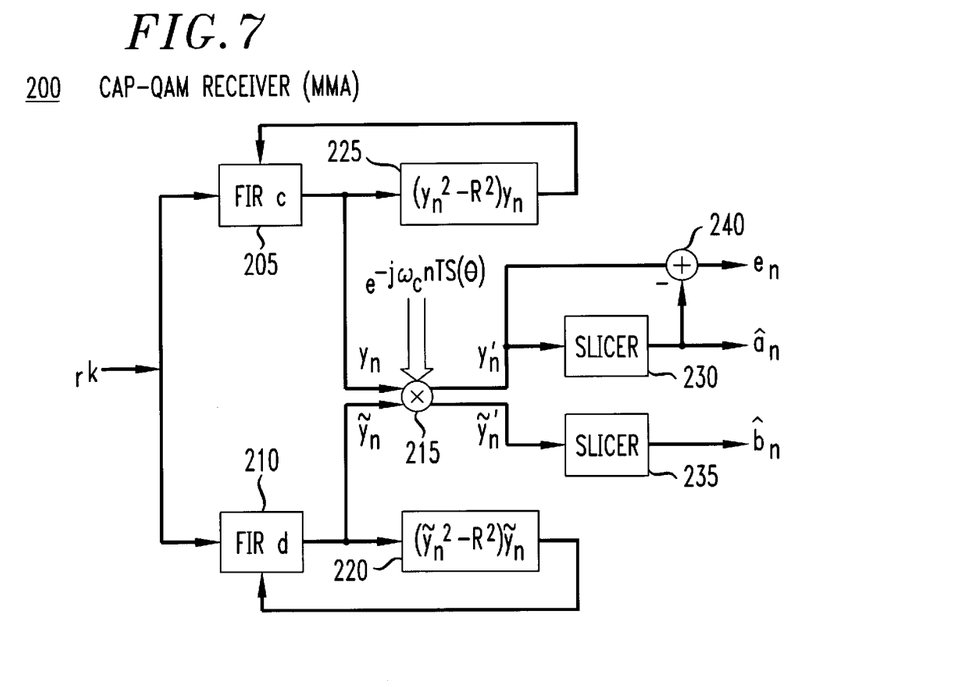
FIG. 7 shows a block diagram illustrating tap updating of an equalizer structure in accordance with the inventive concept.

In accordance with the inventive concept, a portion 200 of a dual-mode receiver for CAP and QAM, such as receiver 10 of FIG. 4, (also referred to herein as a CAP-QAM receiver) is shown in FIG. 7. Other than the inventive concept, the elements shown in FIG. 7 are well-known and will not be described in detail. CAP-QAM receiver portion 200 comprises rotator 215, filter updating elements 220 and 225, slicers 230 and 235, element 240, and a single phase-splitting FSLE as represented by FIR filters 205 and 210. CAP-QAM receiver portion 200 illustrates the tap updating of FIR filters 205 and 210. As can be observed from filter updating elements 220 and 225 of FIG. 7, CAP-QAM receiver portion 200 uses the same filter updating algorithm independent of the type of received signal. For the purposes of this example, it is assumed that the MMA blind equalization algorithm is used. However, the inventive concept is not so limited and other forms of blind equalization can be used, such as, but not limited to, RCA and CMA (described below). As described further below, the value of the constant R (shown in filter updating elements 220 and 225, and described further below) is adjusted as a function of the type of received signal. As such, this receiver can be started blindly without knowing whether the received signal is a QAM signal or a CAP signal.

Figure 8:
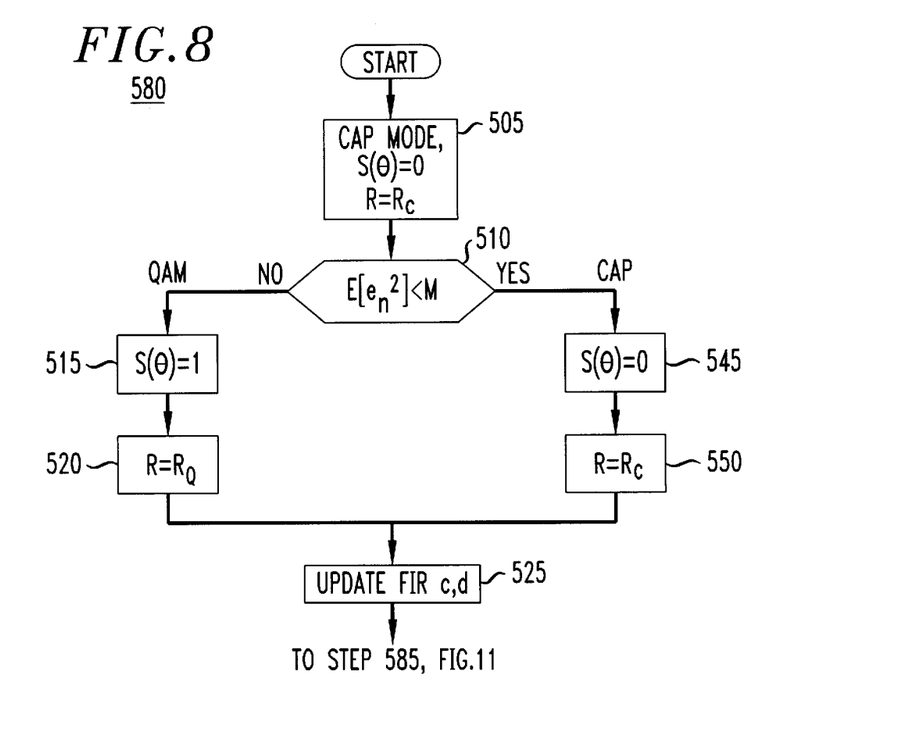
FIG. 8 shows an illustrative flow chart of a method in accordance with the principles of the invention.

Reference now should also be made to FIG. 8 which shows an illustrative flow diagram of a method embodying the principles of the invention for use in a CAP-QAM receiver, such as the structure of FIG. 7. In step 505, the receiver initially starts in the CAP mode of operation. A variable, $S(\theta)$, is set equal to zero and the value for the constant R is initially set to $R_C$ (described below). In step 510, a decision is made as to whether a CAP signal or a QAM signal is being received by comparing the corresponding in-phase component of the mean-squared error, $E[e_n^2]$, to a predetermined MSE value, M (which is determined experimentally and depends upon the signal constellation). (The in-phase error, $e_n$, (developed by element 240 of FIG. 7) is computed and a running average is determined over a number of time periods.) Step 510 of the blind start-up procedure can be schedule-driven, event-driven, or both. For example, a schedule-driven approach occurs after some fixed number, Z, of iterations (which can be determined by a counter, for example). If the value of $E[e_n^2]$ is larger than the value of M then it is assumed that a QAM signal is being received and execution proceeds to steps 515 and 520. In step 515, a variable, $S(\theta)$, is set equal to one, and, in step 520, the value of R is set equal to $R_Q$ (described below). On the other hand, if the value of $E[e_n^2]$ is less than the value of M, then it is assumed that a CAP signal is being received and execution proceeds to steps 545 and 550. In step 545, the variable, $S(\theta)$, is set equal to zero. In step 550, the value of R is set equal to $R_C$ (described below). Once the value of R has been selected, the filter coefficients (in this example, FIR filters 205 and 210 of FIG. 7) are updated in step 525. (It should be obvious to those skilled in the art that the flow chart of FIG. 8 can be further simplified when step 510 determines a CAP signal is being received, e.g., by the elimination of step 545, etc.).

As described above, a variable, $S(\theta)$ is either set to zero or one. This variable controls the operation of rotator 225 of FIG. 7. When $S(\theta)$ is equal to zero, there is effectively no rotation of the filter, or equalizer, output signal $Y_n$, i.e., $Y_n'$ is equal to $Y_n$. In this case, the in-phase error, $e_n$, is equal to $y_n - \hat{a}_n$. However, when $S(\theta)$ is equal to one, the equalizer output signal, $Y_n$, is demodulated by:

$$Y_n' = Y_n e^{j\omega_c nT}, \text{or} \quad (12)$$

$$Y_n' = [y_n \cos(\omega_c nT) + \tilde{y}_n \cos(\omega_c nT) - y_n \sin(\omega_c nT)], \quad (13)$$

where $Y_n' = y_n' + j\tilde{y}_n'$, and $Y_n = y_n + j\tilde{y}_n$. In this case, the in-phase error, $e_n$, is equal to $y_n' - \hat{a}_n$.

As noted above, filter updating elements 220 and 225 of FIG. 7 use the same filter updating algorithm (here, illustratively MMA-based) independent of the type of received signal. The tap updating algorithms are:

$$c_{n+1} = c_n - \alpha(y_n^2 - R^2) y_n r_n, \text{and} \quad (14)$$

$$d_{n+1} = d_n - \alpha(\tilde{y}_n^2 - R^2) \tilde{y}_n r_n. \quad (15)$$

It should be noted that in the case of receiving a QAM signal additional phase compensation may be required. In this case, $Y_n' = Y_n e^{-j[\omega_c nTS(\theta) + \phi_n]}$, where $\phi_n$ is obtained through conventional phase recovery circuitry used in QAM. (Also, see the above-referenced co-pending commonly assigned, U.S. Patent application of L. M. Garth, entitled "Automatic Constellation Phase Recovery in Blind Start-Up Of A Dual Mode CAP-QAM Receiver.")

Figure 9:
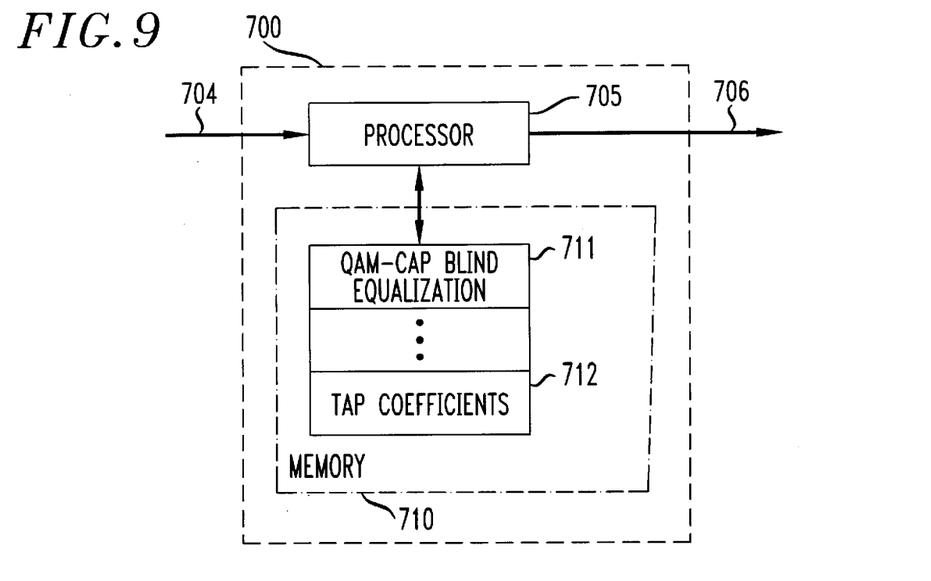
FIGS. 9 and 10 are illustrative block diagrams of a portion of a receiver embodying the principles of the invention.
Figure 10:
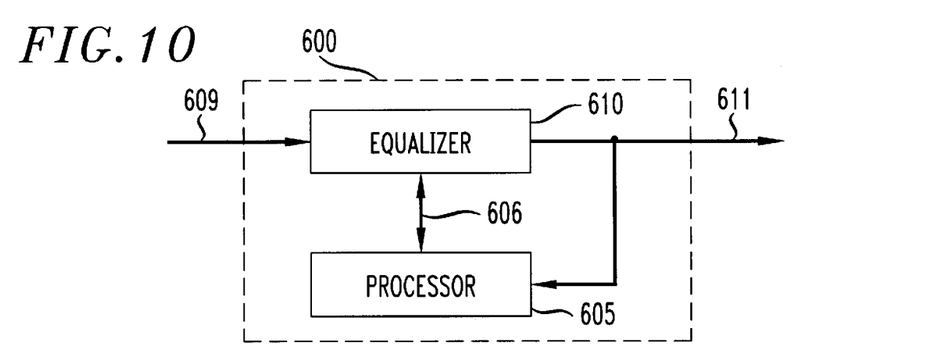

Other illustrative embodiments of the inventive concept are shown in FIGS. 9 and 10 for use in receiver 10 of FIG. 4. FIG. 9 illustrates an embodiment representative of a digital signal processor 700 that is programmed to implement an FSLE in accordance with the principles of the invention. Digital signal processor 700 comprises a central processing unit (processor) 705 and memory 710. A portion of memory 710 is used to store program instructions that, when executed by processor 705, implement CAP-QAM blind equalization (described above). This portion of memory is shown as 711. Another portion of memory, 712, is used to store tap coefficient values that are updated by processor 705 in accordance with the inventive concept It is assumed that a received signal 704 is applied to processor 705, which equalizes this signal in accordance with the inventive concept to provide a output signal 706. For the purposes of example only, it is assumed that output signal 706 represents a sequence of output samples of an equalizer. (As known in the art, a digital signal processor may, additionally, further process received signal 704 before deriving output signal 706.) An illustrative software program is not described herein since, after learning of the CAP-QAM blind equalization as described herein, such a program is within the capability of one skilled in the art. Also, it should be noted that any equalizer structures, such as that described earlier, can be implemented by digital signal processor 700 in accordance with the inventive concept.

FIG. 10 illustrates another alternative embodiment of the inventive concept. Circuitry 600 comprises a central processing unit (processor) 605, and an equalizer 610. The latter is illustratively assumed to be a phase-splitting FSLE as described above. It is assumed that equalizer 610 includes at least one tap-coefficient register for storing values for corresponding tap coefficient vectors (e.g., as shown in FIG. 6). Processor 605 includes memory, not shown, similar to memory 710 of FIG. 9 for implementing CAP-QAM blind equalization. Equalizer output signal 611, which represents a sequence of equalizer output samples, is applied to processor 605. The latter analyzes equalizer output signal 611, in accordance with the inventive concept, to adapt values of the tap coefficients in such a way as to converge to a correct solution.

Figure 11:
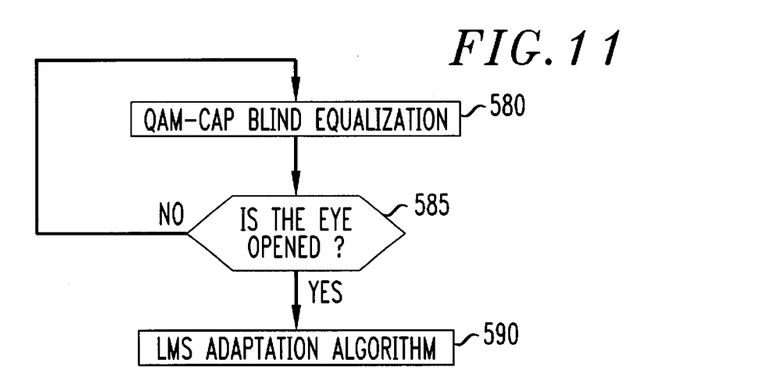
FIG. 11 shows an illustrative blind start-up procedure in accordance with the principles of the invention.

A blind start-up procedure in accordance with the principles of the invention for use in receiver 10 of FIG. 4 is shown in FIG. 11. In step 580, receiver 10 uses CAP-QAM blind equalization with its corresponding tap updating algorithms to begin blind convergence of an equalizer, e.g., steps 505 to 525 of FIG. 8 and equalizer 610 of FIG. 10. In step 585, a decision is made whether to switch from CAP-QAM blind equalization to the LMS adaptation algorithm or to continue using CAP-QAM blind equalization to converge the equalizer. Typically, this is referred to in the art as determining if the eye is open enough (as noted above). Step 585 of the blind start-up procedure can be schedule-driven, event-driven, or both. With a schedule-driven approach, the switch between two different tap updating algorithms occurs after some fixed number, K, of iterations (which can be determined by a counter, for example). This approach presumes a certain amount of eye-opening after K iterations. With an event-driven approach, the switch occurs when a certain quality of eye opening is achieved. This can be done, for example, by continuously monitoring the MSE and making the switch when the MSE is below some threshold S. If the eye has been opened enough, receiver 10 switches to the LMS Adaptation algorithm in step 590. (It should be noted that the focus of the inventive concept is the use of a single equalizer during blind start-up. As such, once the transition to the LMS algorithm occurs, further updates occur as known in the art. For example, in the QAM mode of operation, an additional rotator may have to be used when updating the equalizer using LMS.)

As described further below, and in accordance with the principles of the invention, the value of the constant R (shown in filter updating elements 220 and 225) is adjusted as a function of the type of received signal. In particular, the value of R is either $$R=R_Q, \text{or} \quad (16)$$

$$R=R_C. \quad (17)$$

The value of R is also affected by what type of blind equalization method is being used. Below, values for R are given for the CMA, MMA, and RCA, blind equalization algorithms. (Additional information on these blind equalization algorithms can be found in the above-cited articles.)

CMA

The CMA algorithm for a CAP signal minimizes the following cost function (CF):

$$CF=E[(|Y_n|^L-R^L)^2], \quad (18)$$

where L is a positive integer, $Y_n$ are the equalized samples, and R is the radius of a circle. The case L=2 is the most commonly used in practice. The cost function in equation (18) is a true two-dimensional cost function which minimizes the dispersion of the equalizer complex output signal $Y_n$ with respect to a circle with radius R.

In accordance with the principles of the invention, it can be shown that for the CMA blind algorithm, the CAP-QAM dual mode receiver has the same filter updating algorithm as that of a CAP-only equalizer. As such, when the CMA algorithm is used, $$R_Q=R_C=R. \quad (19)$$

Consequently, assuming a perfectly equalized channel the following value for R results:

$$R_C = R_Q = R = \frac{E[|A_n|^{2L-2} a_n^2]}{E[|A_n|^{L-2} a_n^2]} = \frac{E[|A_n|^{2L}]}{E[|A_n|^L]}, \quad (20)$$

where the expression on the right holds for the usual case where the statistics of the symbols $a_n$ and $b_n$ are the same. As note above, typically, L=2.

MMA

As noted earlier, the MMA algorithm was used in the illustrative example of FIG. 7. The MMA algorithm for a CAP signal minimizes the following cost function:

$$CF=E[(y_n^L-R^L(Y_n))^2+(\tilde{y}_n^L-R^L(Y_n))^2], \quad (21)$$

where L is a positive integer and $R(Y_n)$ and $\tilde{R}(Y_n)$ take discrete positive values, which depend on the equalizer outputs $Y_n$. The MMA algorithm minimizes the dispersion of the equalizer output samples $y_n$ and $\tilde{y}_n$ around piecewise linear in-phase and quadrature contours.

For square constellations, $R(Y_n)=\tilde{R}(Y_n)=R$=constant, so that the cost function of equation (21) becomes:

$$CF=CF_i+CF_q=E[(y_n^L-R^2)^2+(\tilde{y}_n^L-R^L)^2]. \quad (22)$$

Unlike the cost function for CMA represented by equation (18), equation (22) is not a true two-dimensional cost function. Rather, it is the sum of two independent one-dimensional cost functions $CF_i$ and $CF_q$. For L=2, the cost functions of MMA can be represented as:

$$CF=E[(y_n^2-R^2)^2+(\tilde{y}_n^2R^2)^2]. \quad (23)$$

As such, the values for $R_C$ and $R_Q$ are different.

For a CAP signal, assuming a perfectly equalized channel, the following value for $R=R_C$ results:

$$R_C^2 = R^2 = \frac{E[a_n^4]}{E[a_n^2]}. \quad (24)$$

If equation (23) is applied to a QAM signal, in accordance with the principles of the invention, it can be shown that the following value for $R=R_Q$ results:

$$R_Q^2 = R^2 = \frac{E[a_n^4] - 2^*\overline{\cos^2 \omega_c nT \sin^2 \omega_c nT}(E[a_n^4]-3E[a_n^2])}{E[a_n^2]}. \quad (25)$$

From equation (25), it can be observed that for receiving a QAM signal, the constant R is not only a function of the transmitted symbols, but also of the angle $\theta=\omega_c T$, where $\omega_c$ is the radian carrier frequency and T is the symbol period. The constant R can be numerically computed from equation (25). However, the constant R can also be expressed as a function of the number m of symbol levels. As such, equation (25) it can be shown that equation (25) can be alternatively expressed as:

$$R_Q^2=R^2=\tfrac{1}{5}4m^2(3+4\beta)+4\beta-7], \quad (26)$$

where $\beta=\overline{\cos^2\omega_c nT\sin^2\omega_c nT}$. From equation (26), it can be observed that R is a function of m and β with $\omega_c=0 \rightarrow \theta=0 \rightarrow \beta=0$, this leads equation (26) to become:

$$R_Q^2=R^2=\tfrac{1}{5}(12m^2-7), \quad (27)$$

which can be shown to be equivalent to the same value as for MMA with a CAP signal.

The constant R can be computed from either equation (25) or equation (26). Since R is dependent on θ, R can be different even for the same constellation. For instance for 16-QAM with θ=⅗, fc=15.55 MHz and 1/T=25.92 MHz, we obtain β=0.1. Illustrative values of the constant R for CAP and QAM signals are shown in Table One, below for different signal point constellations.

TABLE ONE

| Parameter/Point | 16-Point | 64-Point | 256-Point | 1024-Point |
|---|---|---|---|---|
| m | 2 | 4 | 8 | 16 |
| $R_C$ | 2.86 | 6.08 | 12.34 | 24.76 |
| $R_Q$ | 3.1 | 6.5 | 13.1 | 26.36 |

RCA

The CAP-QAM receiver for RCA is similar to the one for MMA. The cost function of RCA is:

$$CF = E[(Y_n - R\text{sgn}(Y))^2]. \quad (28)$$

For a CAP signal, assuming a perfectly equalized channel, the following value for $R=R_C$ results:

$$R_C = R = \frac{E[a_n^2]}{E[|a_n|]}. \quad (29)$$

If equation (28) is applied to a QAM signal, in accordance with the principles of the invention, it can be shown that the following value for $R=R_Q$ results:

$$R_Q = R = \frac{E[a_n^2 \cos^2 \omega_c nT + b_n^2 \sin^2 \omega_c nT]}{E[|a_n \cos\omega_c nT + b_n^2 \sin\omega_c nT|]}. \quad (30)$$

The numerator of equation (30) can be simplified to $E[a_n^2]$. However, the denominator of equation (30) is difficult to simplify because the expression involves absolute values. So equation (30) can be rewritten as:

$$R_Q = R = \frac{E[a_n^2]}{E[|a_n \cos\omega_c nT + b_n \sin\omega_c nT|]}. \quad (31)$$

In this case, a numerical solution is required to compute R for each application. Illustratively, for a 16-QAM constellation, $R_Q = 2.6$.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was illustrated herein as being implemented with discrete functional building blocks, e.g., equalizer 610, etc., the functions of any one or more of those building blocks can be carried out using one or more appropriately programmed processors or processing circuitry, e.g., a digital signal processor; discrete circuit elements; integrated circuits; etc. In addition, although the inventive concept was described in the context of a single phase-splitting equalizer, other forms of equalizers can also be used.

What is claimed:

1. An improved apparatus for use in receiving a carrierless amplitude modulation/phase modulation (CAP) signal or a quadrature amplitude phase modulation (QAM) signal, the improvement comprising
 a receiver that has a dual mode of operation, a CAP mode and a QAM mode, that utilizes only a single equalizer for both the CAP mode of operation and the QAM mode of operation
 wherein the equalizer has an associated set of tap coefficients, wherein the same equalization updating algorithm is used in either the CAP mode of operation or the QAM mode of operation and wherein the equalization updating algorithm is a blind equalization algorithm having a constant whose value is selected as a function of whether the receiver is in the CAP mode of operation or the QAM mode of operation.

2. The improvement of claim 1 wherein the receiver further comprises a demodulator, operative during the QAM mode of operation, for demodulating an output signal of the equalizer.

3. The improvement of claim 1 wherein the blind equalization algorithm is a constant modulus type of algorithm.

4. The improvement of claim 1 wherein the blind equalization algorithm is a multimodulus type of algorithm.

5. The improvement of claim 1 wherein the blind equalization algorithm is a reduced constellation type of algorithm.

6. The improvement of claim 1 wherein the equalizer further comprises a two-filter structure.

7. The improvement of claim 1 wherein the equalization updating algorithm is a function of $\tilde{y}_n^2 - R^2$, where the value of the constant R is selected as a function of whether the receiver is in the CAP mode of operation or the QAM mode of operation.

8. A receiver comprising:
 a filter for filtering a signal to provide a filtered signal;
 a demodulator operative in a first mode of operation for demodulating the filtered signal and operative in a second mode of operation for passing through the filtered signal; and
 a slicer responsive to the output signal from the demodulator for providing a sliced output signal and wherein the mode of operation is selected as a function of an error value between the sliced output signal and the demodulator output signal
 wherein the filter has an associated set of tap coefficients whose values are set by the same updating algorithm in either the first mode of operation or the second mode of operation.

9. The receiver of claim 8 wherein the error value is calculated as a function of a mean square error between the sliced output signal and the demodulator output signal.

10. The receiver of claim 9 wherein the demodulator output signal and the sliced output signal comprise in-phase and quadrature component signals and wherein the mean square error is calculated as a function of a difference between an in-phase value of the demodulator output signal and an in-phase value of the sliced output signal.

11. The receiver of claim 8 wherein the filter performs an equalizer function and further comprises a two-filter structure.

12. The receiver of claim of claim 8 wherein the updating algorithm is a blind equalization algorithm having a constant whose value is selected as a function of whether the receiver is in the first mode of operation or the second mode of operation.

13. The receiver of claim 12 wherein the blind equalization algorithm is a constant modulus type of algorithm.

14. The receiver of claim 12 wherein the blind equalization algorithm is a multimodulus type of algorithm.

15. The receiver of claim 12 wherein the blind equalization algorithm is a reduced constellation type of algorithm.

16. The receiver of claim 12 wherein the first mode of operation corresponds to a carrierless amplitude modulation/phase modulation (CAP) mode of operation and the second mode of operation corresponds to a quadrature amplitude phase modulation (QAM) mode of operation.

17. The receiver of claim 16 wherein the updating algorithm is a function of $\tilde{y}_n^2 - R^2$, where the value of the constant R is selected as a function of whether the receiver is in the CAP mode of operation or the QAM mode of operation.

18. A method for use in a receiver, the method comprising the steps of:
 selecting one of a number of modes of operation for the receiver;
 filtering a signal, with a filter, for providing a filtered signal; and updating coefficients of the filter using an updating algorithm such that at least one constant value of the updating algorithm is selected as a function of the mode of operation of the receiver.

19. The method of claim 18 wherein the modes of operation include a carrierless amplitude modulation/phase modulation (CAP) mode of operation and a quadrature amplitude phase modulation (QAM) mode of operation.

20. The method of claim 19 wherein the updating algorithm is a function of $\tilde{y}_n^2 - R^2$, where the value of the constant R is selected as a function of whether the receiver is in the CAP mode of operation or the QAM mode of operation.

21. The method of claim 18 wherein the selecting step includes the steps of:
determining an error value as a function of the filtered signal; and
selecting the mode of operation as a function of the determined error value.

22. The method of claim 21 wherein the determined error value is determined as a function of a mean square error function.

23. The method of claim 21 wherein the selecting the mode step compares the determined error value to a predetermined value such that if the determined error value is less than the predetermined value one mode of operation is selected otherwise a different mode of operation is selected.

24. The method of claim 18 further comprising the steps of:
processing the filtered signal for providing a processed signal such that in a first mode of operation the processing demodulates the filtered signal and in a second mode of operation the processing passes the filtered signal through; and
slicing the processed signal for providing a sliced signal.

25. The method of claim 24 wherein the selecting step includes the step of selecting the mode of operation as a function of a difference between the processed signal and the sliced signal.

26. The method of claim 25 wherein the selecting step includes the step of selecting the mode of operation as a function of a mean square error of a difference between the processed signal and the sliced signal.

27. The method of claim 26 wherein the processed signal and the sliced signal further comprise an in-phase component and a quadrature component.

28. The method of claim 27 wherein the difference is between the in-phase components of the respective signals.

29. The method of claim 18 wherein the updating algorithm is a blind equalization algorithm.

30. The method of claim 29 wherein the blind equalization algorithm is a constant modulus type of algorithm.

31. The method of claim 29 wherein the blind equalization algorithm is a multimodulus type of algorithm.

32. The method of claim 29 wherein the blind equalization algorithm is a reduced constellation type of algorithm.

33. A method for use in a receiver, the method comprising the steps of:
determining an error value as a function of a difference between a first version of a signal and a second version of a signal;
selecting a mode of operation as a function of the error value; and
setting a constant of a tap updating algorithm to a value as a function of the selected mode.

34. The method of claim 33 further comprising the step of updating tap coefficients of a filter using the tap updating algorithm.

35. The method of claim 33 wherein the determining the error value step includes the step of determining a mean square error of the difference between the first version of the signal and the second version of the signal.

36. The method of claim 35 wherein the difference is between respective in-phase components of the first version of the signal and the second version of the signal.

37. The method of claim 33 further comprising the steps of:
filtering a signal for providing a filtered signal;
processing the filtered signal to provide the first version of the signal such that in one mode of operation the first version of the signal represents a demodulated version of the filtered signal and in an other mode of operation the first version of the signal represents the filtered signal; and
slicing the first version of the signal for providing the second version of the signal.

38. The method of claim 33 wherein the updating algorithm is a blind equalization algorithm.

39. The method of claim 38 wherein the blind equalization algorithm is a constant modulus type of algorithm.

40. The method of claim 38 wherein the blind equalization algorithm is a multimodulus type of algorithm.

41. The method of claim 38 wherein the blind equalization algorithm is a reduced constellation type of algorithm.

42. The method of claim 33 wherein one mode of operation is a carrierless amplitude modulation/phase modulation (CAP) mode of operation and another mode of operation is a quadrature amplitude phase modulation (QAM) mode of operation.

43. The method of claim 42 wherein the tap updating algorithm is a function of $\tilde{y}_n^2 - R^2$, where the value of the constant R is selected as a function of whether the receiver is in the CAP mode of operation or the QAM mode of operation.

44. A method for use in a receiver, the method comprising the steps of:
equalizing a signal, with a filter, for providing an equalized signal; and
updating coefficients of the filter using a blind equalization type of tap updating algorithm such that at least one constant value of the updating algorithm is selected as a function of a mode of operation of the receiver, wherein the mode is determined by the type of received signal.

45. The method of claim 44 wherein one mode of operation is a carrierless amplitude modulation/phase modulation (CAP) mode of operation and another mode of operation is a quadrature amplitude phase modulation (QAM) mode of operation.

46. The method of claim 45 wherein the updating algorithm is a function of $\tilde{y}_n^2 - R^2$, where the value of the constant R is selected as a function of whether the receiver is in the CAP mode of operation or the QAM mode of operation.

47. The method of claim 44 further comprising the step of selecting the mode of operation.

48. The method of claim 47 wherein the selecting step includes the steps of:
determining an error value as a function of the equalized signal; and
selecting the mode of operation as a function of the determined error value.

49. The method of claim 48 wherein the determined error value is determined as a function of a mean square error function.

50. The method of claim 48 wherein the selecting the mode step compares the determined error value to a predetermined value such that if the determined error value is less than the predetermined value one mode of operation is selected otherwise a different mode of operation is selected.

51. The method of claim 44 further comprising the steps of:
   processing the equalized signal for providing a processed signal such that in a first mode of operation the processing demodulates the filtered signal and in a second mode of operation the processing passes the filtered signal through; and
   slicing the processed signal for providing a sliced signal.

52. The method of claim 51 further comprising the step of selecting the mode of operation as a function of a difference between the processed signal and the sliced signal.

53. The method of claim 51 further comprising the step of selecting the mode of operation as a function of a mean square error of a difference between the processed signal and the sliced signal.

54. The method of claim 53 wherein the processed signal and the sliced signal further comprise an in-phase component and a quadrature component.

55. The method of claim 54 wherein the difference is between the in-phase components of the respective signals.

56. The method of claim 44 wherein the blind equalization algorithm is a constant modulus type of algorithm.

57. The method of claim 44 wherein the blind equalization algorithm is a multimodulus type of algorithm.

58. The method of claim 44 wherein the blind equalization algorithm is a reduced constellation type of algorithm.

59. A method for use in a receiver, the method comprising the steps of:
   selecting a mode of operation;
   setting a constant of a tap updating algorithm to a value as a function of the selected mode of operation;
   determining an error value as a function of a difference between a first version of a signal and a second version of a signal; and
   selecting a mode of operation as a function of the error value.

60. The method of claim 59 further comprising the step of updating tap coefficients of a filter using the tap updating algorithm.

61. The method of claim 59 wherein the determining the error value step includes the step of determining a mean square error of the difference between the first version of the signal and the second version of the signal.

62. The method of claim 61 wherein the difference is between respective in-phase components of the first version of the signal and the second version of the signal.

63. The method of claim 59 further comprising the steps of:
   filtering a signal for providing a filtered signal;
   processing the filtered signal to provide the first version of the signal such that in one mode of operation the first version of the signal represents a demodulated version of the filtered signal and in an other mode of operation the first version of the signal represents the filtered signal; and
   slicing the first version of the signal for providing the second version of the signal.

64. The method of claim 59 wherein the updating algorithm is a blind equalization algorithm.

65. The method of claim 64 wherein the blind equalization algorithm is a constant modulus type of algorithm.

66. The method of claim 64 wherein the blind equalization algorithm is a multimodulus type of algorithm.

67. The method of claim 64 wherein the blind equalization algorithm is a reduced constellation type of algorithm.

68. The method of claim 59 wherein one mode of operation is a carrierless amplitude modulation/phase modulation (CAP) mode of operation and another mode of operation is a quadrature amplitude phase modulation (QAM) mode of operation.

69. The method of claim 68 wherein the tap updating algorithm is a function of $\tilde{y}_n^2 - R^2$, where the value of the constant R is selected as a function of whether the receiver is in the CAP mode of operation or the QAM mode of operation.

* * * * *